Figure 1:
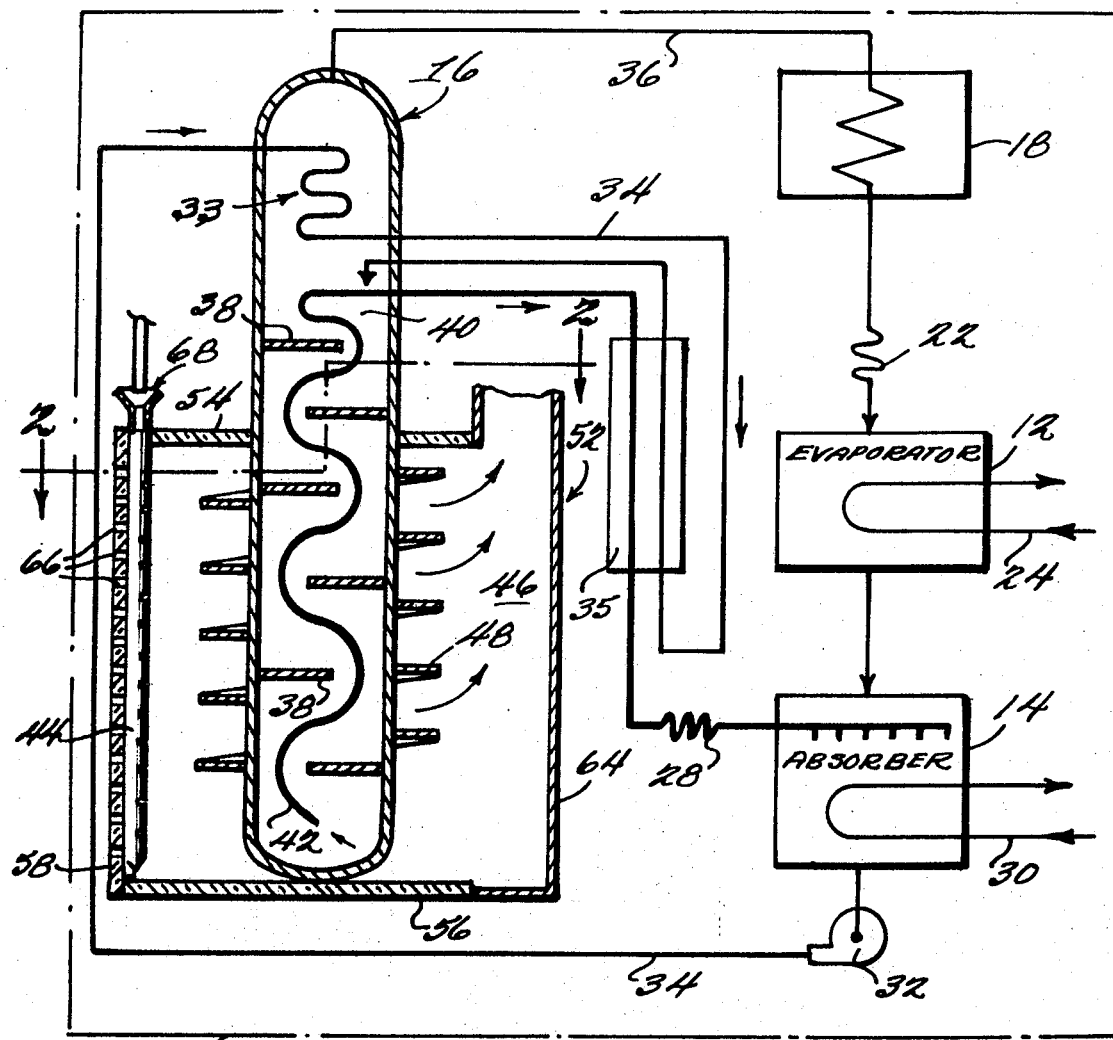

United States Patent [19]
Merrick

[11] 3,750,421
[45] Aug. 7, 1973

[54] HORIZONTAL FIRING OF GENERATOR IN ABSORPTION REFRIGERATOR

[75] Inventor: Richard H. Merrick, Evansville, Ind.

[73] Assignee: Arkla Industries, Inc., Evansville, Ind.

[22] Filed: July 21, 1972

[21] Appl. No.: 273,809

Related U.S. Application Data
[63] Continuation of Ser. No. 813,527, April 4, 1969.

[52] U.S. Cl.................. 62/476, 62/497, 122/235 R
[51] Int. Cl............................................ F25b 15/02
[58] Field of Search .................. 62/476, 497; 122/5, 122/47, 111, 120, 136, 238, 336, 492, 508, 14, 18, 19, 135, 259, 140, 153, 234, 235; 237/57; 158/99, 117

[56] References Cited
UNITED STATES PATENTS
| | | | |
|---|---|---|---|
| 2,337,870 | 12/1943 | Coons.................................. | 62/101 |
| 3,316,727 | 6/1967 | Bourne................................ | 62/476 |
| 3,367,137 | 2/1968 | Whitlow.............................. | 62/497 |

Primary Examiner—William F. O'Dea
Assistant Examiner—Peter D. Ferguson
Attorney—Cushman, Darby & Cushman

[57] ABSTRACT

A heat exchanger, such as a vertically disposed cylindrical generator in an absorption refrigeration appliance, is heated by means of a horizontal flow of hot combustion products from a gas burner tube which is disposed parallel to the generator thereby reducing the height of the appliance.

3 Claims, 2 Drawing Figures

INVENTOR
RICHARD H. MERRICK

HORIZONTAL FIRING OF GENERATOR IN ABSORPTION REFRIGERATOR

This is a continuation, of application Ser. No. 813,527, filed Apr. 4, 1969.

This invention relates to flame-fired heat exchangers, such as those heated with an oil burner or gas burner, and in particular to the construction and arrangement of the parts to effect heating by means of a horizontal flow of hot combustion products past the vessel or other container which defines the heat exchanger.

The invention is applicable to heaters generally, including hot water heaters, but has particular application to the heating of the refrigerant vapor generator in an absorption refrigeration appliance.

Absorption refrigeration systems include as basic elements a heat exchanger, commonly called the generator, which is employed to heat an absorbent solution so as to drive off refrigerant vapor. The absorbent solution may be, for example, an aqueous ammonia solution in which case the refrigerant gas driven off is ammonia. The gas passes to a condenser, where it is condensed at relatively high pressure by heat exchange with an ambient fluid such as cooling water or atmospheric air, and then through a restriction, such as an expansion valve, to an evaporator where the refrigerating effect is produced. The relatively low pressure gas then flows to an absorber where it contacts and absorbs into liquid obtained from the generator. The resulting absorption solution then passes to the generator where relatively high pressure refrigerant gas is again driven off by heating.

The generator unit in this type of refrigerating unit is basically a vessel for containing the absorption solution and the released vapor while heat is applied to the solution. Often the vessel is in the form of an elongated, vertically disposed hollow cylinder having an internal construction and arrangement of baffles which increase the contact area between vapor and liquid in a manner analogous to the operation of a distillation column. More specifically, a body of the solution is heated in the lower portion of the vessel, and the rising vapor passes out the top of the vessel after flowing in counter-current contact with an incoming stream of solution. As a practical matter, with reference to a relatively small machine such as may be employed in a 5-ton air conditioner, the generator is often a significant factor in the overall height of the whole combination, because the generator efficiency is related to its height and because the generator is usually the tallest component in the machine. When the generator is gas-fired the total height of the complete generator has heretofore been further increased because it has been the practice to place the burner tube directly below the generator vessel. This is often a disadvantage, because space availability and customer preference generally dictate an appliance which is low in height.

The broad object of the invention is to provide a horizontally-fired heat exchanger by establishing a flame along one vertical dimension of the heat exchanger and by using a mechanical draft to create a horizontal flow velocity of combustion products that overrides natural vertical convective influences.

It is a more specific object to provide a flame-fired generator combination in an absorption refrigeration machine in which the refrigerant vapor generator is heated from the side thereby reducing the overall height of the generator-burner combination.

Figure 2:
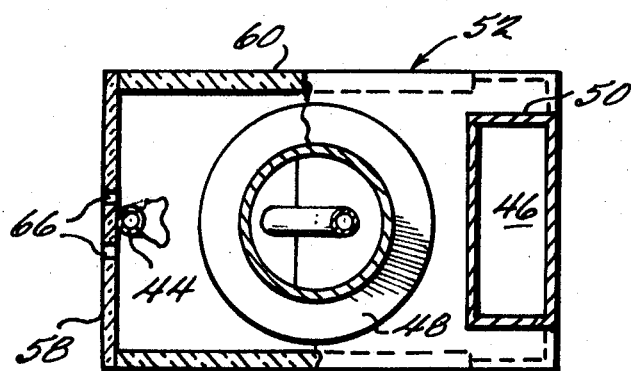

The invention will be further understood from the following detailed description of an exemplary embodiment taken with the drawings in which:

FIG. 1 is a simplified view, partly in diagrammatic form, illustrating a refrigeration machine embodying the principles of the present invention; and FIG. 2 is a sectional view taken on the line 2—2 of FIG. 1.

Referring to FIG. 1, there is shown in simplified form an absorption refrigeration machine for use for example with a 5-ton air conditioner, which includes as basic elements an evaporator 12, an absorber 14, a refrigerant vapor generator 16, and a condenser 18. The evaporator 12 includes an expansion valve 22 or its equivalent to reduce the pressure on a stream of high pressure liquid refrigerant, the cold which is thereby generated being employed to cool a stream of air or, as shown, a coil 24 containing a secondary coolant. Relatively low pressure refrigerant vapor from the evaporator 12 passes to the absorber 14 where it contacts and is absorbed into a stream of absorbent solution obtained from the generator 16 by means of a line 26. The latter contains a restriction 28 inasmuch as the solution leaves the generator 16 at relatively high pressure. Heat is removed from the absorber 14 in any convenient way as by means of a cooling coil 30.

The solution from the absorber 14 is pressurized by a pump 32 and sent through a line 34 to the generator 16 where it is heated to release the refrigerant in vapor form. The vapor passes through a line 36 to the condenser 18 which may be of the air cooled type, and the condensed refrigerant is then passes to the evaporator 12. The refrigerant vapor in the upper section of the generator 16 passes in heat exchange relationship with the solution in the line 34 by means of a rectifier 33 where water vapor is condensed from the refrigerant vapor. The solution in the line 24, before entering the generator 16, passes in heat exchange relationship with the solution leaving the generator 16 through the line 26, a heat exchanger 35 being provided for this purpose.

The generator 16 is illustrated as being of the so-called analyzer type which effects counter-current contact of the released refrigerant vapor with an incoming stream of absorber solution in a number of sequential stages, the vapor passing upwardly through the generator and the solution passing downwardly during counter-current contact. This may be achieved by means of any of a variety of internal plate constructions which cause the solution to flow back and forth across the generator column. As is known, the performance, in terms of efficiency, of this type of generator is directly related to the number of stages and hence the height of the generator. As shown, there are a plurality of horizontal, vertically spaced plates 38 each of which is provided with a flow opening 40 staggered with respect to the openings in the adjacent plates. The hot solution, after release of the refrigerant vapor, passes in counter-current heat exchange relationship with incoming cooler solution by flowing upwardly through a tube 42 which extends through the plates 38 to the top of the generator column 16.

All of the above components, as described thus far, and their illustrated relationship to each other are conventional and have been described in general terms in order that the improvement may be described in its proper environment. As previously stated, when the generator 16 is heated by means of a gas flame, the gas burner has been disposed directly below the lower end of the generator thereby increasing the height of the generator combination and the overall height of the refrigeration appliance. The present invention provides for heating the generator 16 from the side so that no additional height is added by the presence of the burner components. As shown, this may be achieved by means of at least one vertically disposed burner tube 44 disposed parallel to the generator 16 and a flue arrangement 46 on the opposite side of the generator 16, the flue arrangement 46 being adapted to provide a mechanical draft which overrides natural vertical convection currents so that the flow of combustion products will be generally horizontal across the lower portion of the generator 16. The flue arrangement may include various baffles and may cooperate with fins on the generator, such as the spiral fin 48, in order to create the necessary draft. It will be appreciated that the configuration and relative positions of these parts may vary from machine to machine in accordance with the size and relationship of the components in the refrigerant cycle.

In the illustrated embodiment the necessary horizontal draft is obtained using a single vertical burner tube together with the spiral fin 48 on the lower portion of the generator 16 and a simple combustion gas outlet pipe 50 disposed on the opposite side of the generator 16 from the burner tube, extending upwardly from the upper end of an enclosure 52 which surrounds the lower portion of the generator. The outlet pipe 50 is vented to the atmosphere at some convenient location, and there may be provided suitable baffles and venting arrangements to effect the necessary draft.

As shown, the enclosure 52 is a box-like structure having top and bottom walls 54 and 56 constructed of insulating material and three side walls 58, 60 and 62 also of insulating material. The remaining side wall 64 and the outlet pipe 50 may be constructed of sheet metal. Preferably the lower end of the generator 16 rests on the bottom wall 56. The side wall 58, which is adjacent the burner tube 44, is provided with suitable apertures 66 for the entry of secondary air to support combustion. Primary combustion air enters the burner tube 44 through any conventional arrangement such as that illustrated at 68. Both primary air and secondary air may be adjusted as part of the arrangement which effects the horizontal draft through the enclosure 52.

Other forms of burners may be employed. For example, the burner may be located just below the top wall 54 and constructed so as to produce a downwardly extending flame which is generally parallel to and coextensive with the lower portion of the generator.

From the above it will be apparent that the horizontal firing of the generator 16 eliminates from the appliance the height consumed by burners and combustion space when the generator 16 is fired vertically from a point below the lower end of the generator 16. This savings in height may be quite important in a relatively small capacity machine where the entire machine is a unitary structure in the sense that all the refrigeration components are disposed within a common housing, the latter being illustrated at 70 in FIG. 1. The present demand with regard to such machines is for compact machines particularly machines which are low in height. Further, the fin height, thickness and method of attachment to the wall of the generator 16 can be optimized more flexibly with the horizontally fired arrangement. The arrangement is also advantageous in that it effectively supplies heat to vertical flow of fluid within the generator 16. Also variable fin heights permit variable input for variable tonnage within limits as contrasted with bottom firing.

What is claimed is:

1. In an absorption type refrigeration machine which includes a generally cylindrical vertically elongated generator vessel for driving off refrigerant vapor from a solution passing downwardly through said generator vessel, said vessel having a solution inlet near its upper end and a refrigerant vapor outlet near its upper end, said machine further including, a refrigerant condenser, a refrigerant evaporator, and an absorber connected in a refrigeration circuit the improvement which comprises means for heating the lower portion of said generator vessel with a generally horizontal flow of gaseous combustion products past said lower portion of said vessel, said means including an enclosure around only the lower portion of said vessel and at least one fluid fuel burner disposed generally parallel to said lower portion of said vessel for effecting a flame extending generally vertically and parallel to and generally coextensive with the exterior of said lower portion of said vessel and draft-inducing structure overriding natural vertical convection currents for directing hot combustion products from the flame in a generally horizontal direction across the lower portion of said generator vessel and then upwardly away from said generator vessel, said structure including a combustion products outlet pipe extending from said enclosure at a location generally on the other side of said lower portion of said vessel from said burner thereby eliminating from said refrigeration machine that height which would be consumed by a burner and combustion space when vertical firing of the generator vessel is employed.

2. Apparatus as in claim 1 including fins on said lower portion of said vessel for assisting in effecting the horizontal flow of combustion products.

3. Apparatus as in claim 2 wherein said generator vessel includes internal baffles in both its upper and lower portions for counter-current contacting refrigerant vapor with solution in a plurality of vertically spaced apart stages.

* * * * *